US009849653B2

(12) United States Patent
Araki et al.

(10) Patent No.: US 9,849,653 B2
(45) Date of Patent: Dec. 26, 2017

(54) MOLD RELEASE FILM AND PRODUCTION METHOD FOR SAME

(71) Applicant: UNITIKA LTD., Hyogo (JP)

(72) Inventors: Goro Araki, Kyoto (JP); Nobuyasu Okumura, Kyoto (JP); Yoshimi Ueno, Kyoto (JP)

(73) Assignee: UNITIKA LTD., Hyogo (JP)

( * ) Notice: Subject to any disclaimer, the term of this patent is extended or adjusted under 35 U.S.C. 154(b) by 227 days.

(21) Appl. No.: 14/652,311

(22) PCT Filed: Jan. 9, 2014

(86) PCT No.: PCT/JP2014/050174
§ 371 (c)(1),
(2) Date: Jun. 15, 2015

(87) PCT Pub. No.: WO2014/109341
PCT Pub. Date: Jul. 17, 2014

(65) Prior Publication Data
US 2015/0367610 A1 Dec. 24, 2015

(30) Foreign Application Priority Data
Jan. 11, 2013 (JP) ................. 2013-003028

(51) Int. Cl.
B32B 27/36 (2006.01)
B32B 27/08 (2006.01)
B32B 27/32 (2006.01)
B32B 7/06 (2006.01)
B32B 7/12 (2006.01)
B32B 27/30 (2006.01)
B05D 1/28 (2006.01)
B05D 3/02 (2006.01)
B05D 3/12 (2006.01)
C08J 7/04 (2006.01)

(52) U.S. Cl.
CPC ............... B32B 27/08 (2013.01); B05D 1/28 (2013.01); B05D 3/0272 (2013.01); B05D 3/12 (2013.01); B32B 7/06 (2013.01); B32B 7/12 (2013.01); B32B 27/306 (2013.01); B32B 27/32 (2013.01); B32B 27/36 (2013.01); C08J 7/047 (2013.01); B32B 2307/748 (2013.01); B32B 2405/00 (2013.01); C08J 2367/02 (2013.01); C08J 2423/26 (2013.01); Y10T 428/31797 (2015.04)

(58) Field of Classification Search
CPC ......... B32B 27/08; B32B 27/36; B32B 27/32; B05D 1/28; B05D 3/0272; B05D 3/12
USPC ........................................... 428/483
See application file for complete search history.

(56) References Cited

U.S. PATENT DOCUMENTS 8,535,774 B2 9/2013 Okumura et al.
2006/0292325 A1 12/2006 Nozawa et al.

FOREIGN PATENT DOCUMENTS

| CN | 1839039 A | 9/2006 |
| CN | 102198714 A | 9/2011 |
| EP | 2179844 | 4/2010 |
| JP | 2002-20516 | 1/2002 |
| JP | 2005-146080 | 6/2005 |
| JP | 2008-302547 | 12/2008 |
| JP | 2011-20419 | 2/2011 |
| JP | 2011020419 A * | 2/2011 |
| JP | 2011-127236 | 6/2011 |
| JP | 2011-191354 | 9/2011 |
| JP | 2012-20429 | 2/2012 |
| JP | 2012020429 A * | 2/2012 |
| JP | 2012-144021 | 8/2012 |
| TW | 201132485 | 10/2011 |

OTHER PUBLICATIONS

Office Action in corresponding Taiwanese application No. 103100923 dated Nov. 17, 2016.
English language machine translation of JP2011-201033 which corresponds to TW 201132485.
International Search Report in corresponding PCT application PCT/JP2014/050174.
Office Action in corresponding Japanese patent application No. 2014-533307.
English language machine translation of JP2011-20419.
English language machine translation of JP2012-20429.
English language machine translation of JP2012-144021.
English language machine translation of JP2011-127236.
English language machine translation of JP2005-146080.
English language machine translation of JP2008-302547.
English language machine translation of JP2002-20516.
English language machine translation of JP 2011-191354.
Extended European Search Report in corresponding European Application No. 14737944.0.
Office Action in corresponding Chinese application 201480002978.X dated May 17, 2016.
English language machine translation of CN102198714A.

* cited by examiner

Primary Examiner — Hui Chin
(74) Attorney, Agent, or Firm — Fildes & Outland, P.C.

(57) ABSTRACT

The present invention provides a mold release film including a resin layer provided on one surface of a polyester film, wherein the resin layer includes 100 parts by mass of a polypropylene-based modified polyolefin resin with the proportion of a modifying component of 1 to 10% by mass and 1 to 50 parts by mass of a cross-linking agent; the peel strength between the resin layer and a pressure-sensitive adhesive measured by bonding a rubber-based pressure-sensitive adhesive to the resin layer exceeds 3.0 N/cm; and the residual adhesion rate of a pressure-sensitive adhesive after bonding an acrylic pressure-sensitive adhesive to the resin layer is 80% or more.

5 Claims, No Drawings

MOLD RELEASE FILM AND PRODUCTION METHOD FOR SAME

TECHNICAL FIELD

The present invention relates to a mold release film suitable as a mold release material.

BACKGROUND ART

Polyester films typified by polyethylene terephthalate film are widely used in industrial fields because polyester films have excellent mechanical properties, heat resistance and chemical resistance. Among others, the demand for process materials has recently remarkably grown; in particular, mold release materials, belonging to one category of process materials, are widely used in electric and electronic fields. Examples of the application of the mold release material include protective materials for the pressure-sensitive adhesive/adhesive surface of pressure-sensitive adhesive materials such as pressure-sensitive adhesive sheets and pressure-sensitive adhesive tapes.

As a mold release material prepared by providing a resin layer having mold releasability on the surface of a polyester film, for example, Patent Literature 1 discloses a mold release sheet prepared by providing, with post-coating, a resin layer including a polypropylene-based modified polyolefin resin on a polyester film. However, when a pressure-sensitive adhesive material having a large peel strength is bonded to the resin layer provided through post-coating, the components of the resin layer sometimes migrate into the pressure-sensitive adhesive material, and hence the peeled-off pressure-sensitive adhesive material is degraded in pressure-sensitive re-adhesiveness, is low in residual adhesion rate and is disadvantageously impaired in the performances as a pressure-sensitive adhesive material.

Patent Literature 2 and Patent Literature 3 disclose mold release films being each prepared by providing, through inline coating, a resin layer including a polyethylene-based modified polyolefin resin on a polyester film. However, the resin layer including a polyethylene-based modified polyolefin resin is small in peel strength, and hence when the resin layer to which a pressure-sensitive adhesive material is bonded is subjected to punching processing, detachment sometimes occurs in the edge of the resin layer, and disadvantageously neat punching is sometimes impossible.

When a mold release film including a resin layer provided on one surface of a polyester film, described in each of Patent Literature 1 to Patent Literature 3, is wound in a form of a roll, the components of the resin layer sometimes migrate, depending on the composition of the resin layer, to the opposite surface to the surface provided with the resin layer to contaminate the opposite surface.

CITATION LIST

Patent Literature

Patent Literature 1: JP2011-20419A
Patent Literature 2: JP2012-20429A
Patent Literature 3: JP2012-144021A

SUMMARY OF INVENTION

Technical Problem

In view of such problems as described above, an object of the present invention is to provide a mold release film suitable as a mold release material, hardly allowing the resin layer components to migrate into a pressure-sensitive adhesive material and allowing the peeled-off pressure-sensitive adhesive material to maintain the residual adhesion rate thereof at a high level even when the peel strength between the resin layer and the pressure-sensitive adhesive material is large, and being free from the contamination of the opposite surface to the surface provided with the resin layer even when the mold release film is wound in a form of a roll.

Solution to Problem

The present inventors made a diligent study for the purpose of solving such problems as described above, and consequently have reached the present invention by discovering that the above-described problems can be solved by allowing the processing of a mold release film to include: applying to a polyester film a liquid material for forming a resin layer; and drying, stretching and heat treating the polyester film including the liquid material applied thereto.

Specifically, the gist of the present invention is the following (1) to (5).

(1) A mold release film including a resin layer provided on one surface of a polyester film, wherein the resin layer includes 100 parts by mass of a polypropylene-based modified polyolefin resin with a proportion of a modifying component of 1 to 10% by mass and 1 to 50 parts by mass of a cross-linking agent; a peel strength between the resin layer and the pressure-sensitive adhesive measured by bonding a rubber-based pressure-sensitive adhesive to the resin layer exceeds 3.0 N/cm; and the residual adhesion rate of the pressure-sensitive adhesive after bonding an acrylic pressure-sensitive adhesive to the resin layer is 80% or more.

(2) The mold release film according to (1), wherein the resin layer further includes polyvinyl alcohol, and the content of polyvinyl alcohol is 10 to 1000 parts by mass in relation to 100 parts by mass of the polypropylene-based modified polyolefin resin.

(3) The mold release film according to (1) or (2), wherein the contact angle of water on the opposite surface to the surface provided with the resin layer is 80° or less.

(4) The mold release film according to any one of (1) to (3), wherein the polyester film has a multilayer structure formed by laminating two or more types of layers.

(5) A method for producing a mold release film, the production method being a method for producing the mold release film according to (1), and including: applying to a polyester film a liquid material including 100 parts by mass of a polypropylene-based modified polyolefin resin with the proportion of a modifying component of 1 to 10% by mass, 1 to 50 parts by mass of a cross-linking agent and a liquid medium; and drying, stretching and heat treating the polyester film including the liquid material applied thereto.

Advantageous Effects of Invention

The mold release film of the present invention hardly allows the resin layer components to migrate into a pressure-sensitive adhesive material and allows the peeled-off pressure-sensitive adhesive material to maintain the residual adhesion rate thereof at a high level even when the peel strength between the resin layer and the pressure-sensitive adhesive material is large, and hence can be suitably used in the applications to materials such as protective materials for the pressure-sensitive adhesive/adhesive surface of pressure-sensitive adhesive materials such as pressure-sensitive adhesive sheets and pressure-sensitive adhesive tapes. The mold release film of the present invention is also free from the contamination, due to the resin layer, of the opposite surface to the surface provided with the resin layer even when the mold release film is wound in a form of a roll.

DESCRIPTION OF EMBODIMENTS

Hereinafter, the present invention is described in detail.

The mold release film of the present invention includes a resin layer provided on one surface of a polyester film, and the resin layer includes a polypropylene-based modified polyolefin resin and a cross-linking agent.

The polypropylene-based modified polyolefin resin used in the present invention is required to be a polypropylene-based resin in which the main component of the olefin component is propylene. The adoption of propylene as the main component of the olefin component allows the peel strength between the resin layer and a pressure-sensitive adhesive measured by bonding a rubber-based pressure-sensitive adhesive to the obtained resin layer to exceed 3.0 N/cm. Further inclusion of butene and ethylene as the olefin component is preferable from the viewpoint of the improvement of the film forming capability.

Examples of the modifying component constituting the polypropylene-based modified polyolefin resin include unsaturated carboxylic acid components, and specifically include acrylic acid, methacrylic acid, maleic acid, maleic anhydride, itaconic acid, itaconic anhydride, fumaric acid and crotonic acid, and additionally, half esters and half amides of unsaturated dicarboxylic acids. Among these, for the purpose of stably dispersing the resin in the below-described aqueous dispersion preparation of a resin, acrylic acid, methacrylic acid, maleic acid and maleic anhydride are preferable, and acrylic acid, methacrylic acid and maleic anhydride are particularly preferable. Two or more of the modifying components may be included in the polypropylene-based modified polyolefin resin.

The proportion of the modifying component in the polypropylene-based modified polyolefin resin is required to be 1 to 10% by mass, and is preferably 2 to 10% by mass and more preferably 2 to 9% by mass. When the proportion of the modifying component is less than 1% by mass, the proportion of the polar groups in the polypropylene-based modified polyolefin resin included in the resin layer comes to be small, and hence sometimes no sufficient adhesiveness to the polyester film is obtained, and the pressure-sensitive adhesive material is possibly contaminated; and additionally, in the below-described aqueous dispersion preparation of a resin, stable dispersion of the resin tends to be difficult. On the other hand, when the proportion of the modifying component exceeds 10% by mass, the proportion of the polar groups is large, hence the adhesiveness between the resin layer and the polyester film comes to be sufficient, but at the same time, the adhesiveness between the resin layer and the pressure-sensitive adhesive material is also increased, and consequently, the mold releasability from the pressure-sensitive adhesive material tends to be degraded.

The polypropylene-based modified polyolefin resin may include, in addition to the above-described components, other components in a content of approximately 10% by mass or less of the whole polyolefin resins. Examples of the other components include: 1-octene; (meth)acrylic acid esters such as ethyl (meth)acrylate and butyl (meth)acrylate; (meth)acrylic acid amides; alkyl vinyl ethers such as methyl vinyl ether and ethyl vinyl ether; vinyl esters such as vinyl formate, vinyl acetate, vinyl propionate, vinyl pivalate and vinyl versatate, and vinyl alcohols obtained by saponifying the vinyl esters with basic compounds or the like; 2-hydroxyethyl acrylate; glycidyl (meth)acrylate; (meth)acrylonitrile; styrene; substituted styrenes; vinyl halides; vinylidene halides; carbon monoxide; and sulfur dioxide. Mixtures of these can also be used.

In the polypropylene-based modified polyolefin resin, examples of the copolymerization forms of the respective components include, without being particularly limited to: random copolymerization and block copolymerization. Among these, from the viewpoint of easiness in polymerization, the random polymerization is preferable. Alternatively, the polypropylene-based modified polyolefin resin may also be a mixture prepared by mixing two or more polyolefin resins so as to satisfy the constituent component proportions of the present invention.

The polypropylene-based modified polyolefin resin is preferably a polypropylene-based resin including an unsaturated carboxylic acid component as the above-described modifying component introduced thereinto, and the method for introducing the unsaturated carboxylic acid component is not particularly limited. Examples of the method for introducing the unsaturated carboxylic acid component include a method in which the unsaturated carboxylic acid is graft copolymerized with the polypropylene-based resin by using, for example, a method in which in the presence of a radical generator, the polypropylene-based resin and the unsaturated carboxylic acid are heated to a temperature equal to or higher than the melting point of the polypropylene-based resin to be melted and are allowed to react with each other, or a method in which the polypropylene-based resin and the unsaturated carboxylic acid are dissolved in an organic solvent, and then, in the presence of a radical generator, are heated, stirred and allowed to react with each other. Because of simpler operations, the former method is preferable.

Examples of the radical generator used in the graft copolymerization include: organic peroxides such as di-tert-butyl peroxide, dicumyl peroxide, tert-butyl hydroperoxide, tert-butyl cumyl peroxide, benzoyl peroxide, dilauryl peroxide, cumene hydroperoxide, tert-butyl peroxybenzoate, methyl ethyl ketone peroxide and di-tert-butyl diperphthalate; and azonitriles such as azobisisobutyronitrile. These may be appropriately selected and used on the basis of the reaction temperature.

In the present invention, the resin layer is required to include a cross-linking agent along with the polypropylene-based modified polyolefin resin. The inclusion of the cross-linking agent allows the constituent components of the resin layer to be cross-linked with each other to improve various performances such as the cohesive force and the water resistance of the resin layer.

The addition amount of the cross-linking agent, in relation to 100 parts by mass of the polypropylene-based modified polyolefin resin, is required to be 1 to 50 parts by mass, and is preferably 2 to 40 parts by mass and more preferably 2 to 30 parts by mass.

As the cross-linking agent, for example, cross-linking agents cross-linking the modified polyolefin and polyvinyl alcohol and compounds having in the molecules thereof a plurality of functional groups capable of reacting with carboxyl groups can be used; among these compounds, for example, isocyanate compounds, melamine compounds, urea compounds, epoxy compounds, carbodiimide compounds and oxazoline compounds are preferable, and in particular, carbodiimide compounds and oxazoline compounds are effective. These cross-linking agents may also be used in combinations with each other.

The carbodiimide compound used as the cross-linking agent is not particularly limited as long as the carbodiimide compound includes in the molecule thereof one or more carbodiimide groups. The carbodiimide compound achieves, in one carbodiimide moiety thereof, cross-linking with the two carboxyl groups in the modified moieties of the polypropylene-based modified polyolefin resin.

Specific examples of the carbodiimide compound include: carbodiimide group-containing compounds such as p-phenylene-bis(2,6-xylylcarbodiimide), tetramethylene-bis(t-butylcarbodiimide) and cyclohexane-1,4-bis(methylene-t-butylcarbodiimide); and polycarbodiimide that is a polymer having carbodiimide groups. One or two or more of these compounds can be used. Preferable among these is polycarbodiimide from the viewpoint of easy handleability.

Examples of the commercially available polycarbodiimide include the Carbodilite series manufactured by Nisshinbo Holdings Inc.; specifically, examples of the Carbodilite series include: water-soluble-type polycarbodiimides such as "SV-02," "V-02," "V-02-L2" and "V-04"; emulsion-type polycarbodiimides such as "E-01" and "E-02"; organic solution-type polycarbodiimides such as "V-01," "V-03," "V-07" and "V-09"; and non-solvent-type polycarbodiimides such as "V-05."

The oxazoline compound used as the cross-linking agent is not particularly limited as long as the oxazoline compound has two or more oxazoline groups in the molecule thereof. The oxazoline compound forms an amide ester in each of the two oxazoline moieties, with one carboxyl group in the modified moieties of the polypropylene-based modified polyolefin resin, to achieve cross-linking.

Specific examples of the oxazoline compound include: oxazoline group-containing compounds such as 2,2'-bis(2-oxazoline), 2,2'-ethylene-bis(4,4'-dimethyl-2-oxazoline), 2,2'-p-phenylene-bis(2-oxazoline) and bis(2-oxazolinylcyclohexane) sulfide; and oxazoline group-containing polymers. One or two or more of these compounds can be used. Preferable among these are oxazoline group-containing polymers from the viewpoint of easy handleability.

Examples of the commercially available oxazoline group-containing polymers include the Epocros series manufactured by Nippon Shokubai Co., Ltd.; specifically, examples of the Epocros series include: water-soluble-type polymers such as "WS-500" and "WS-700"; and emulsion-type polymers such as "K-1010E," "K-1020E," "K-1030E," "K-2010E," "K-2020E" and "K-2030E."

In the present invention, the resin layer preferably includes polyvinyl alcohol. In the resin layer, the dispersion of polyvinyl alcohol in the polypropylene-based modified polyolefin resin appropriately alleviates the releasability achieved by the polypropylene-based modified polyolefin resin, and at the same time, achieves the effect to improve the adhesiveness to the polyester film, possessed by polyvinyl alcohol itself. The inclusion of the cross-linking agent and polyvinyl alcohol in the resin layer results in the formation of micro protrusions on the surface of the resin layer, and hence remarkably improves the easy slippage of the resin layer.

Examples of the type of polyvinyl alcohol include, without being particularly limited to: a product obtained by completely or partially saponifying a polymer of a vinyl ester.

Polyvinyl alcohol is preferably provided with water solubility for the case where polyvinyl alcohol is used as a liquid material as described below.

The average degree of polymerization of polyvinyl alcohol is not particularly limited; polyvinyl alcohols having an average degree of polymerization falling within a range from 300 to 5,000 can be used; however, the average degree of polymerization of polyvinyl alcohol is preferably 300 to 2,000 from the viewpoint of the stability improvement of the liquid material for forming the resin layer.

When polyvinyl alcohol is included, the content of polyvinyl alcohol is, in relation to 100 parts by weight of the polypropylene-based modified polyolefin resin, preferably 10 to 1000 parts by mass, more preferably 10 to 600 parts by mass, furthermore preferably 20 to 400 parts by mass and most preferably 30 to 300 parts by mass. The content of polyvinyl alcohol set to fall within the above-described range can make lower the effect on the releasability of the resin layer, due to the heating during drying or heat treatment at the time of forming the resin layer on the polyester film.

Examples of the commercially available polyvinyl alcohol include: "JC-05," "VC-10," "ASC-05X" and "UMR-10HH" of "J-Poval" manufactured by Japan Vam & Poval Co., Ltd.; "PVA-103" and "PVA-105" of "Kuraray Poval" and "AQ4104" and "HR3010" of "Exceval" manufactured by Kuraray Co., Ltd.; and "PC-1000" and "PC-2000" of "Denka Poval" manufactured by Denki Kagaku Kogyo K.K.

In the present invention, the resin layer may include a lubricant within a range not impairing the advantageous effects of the present invention. Examples of the lubricant include: inorganic particles of the compounds such as calcium carbonate, magnesium carbonate, calcium oxide, zinc oxide, magnesium oxide, silicon oxide, sodium silicate, aluminum hydroxide, iron oxide, zirconium oxide, barium sulfate, titanium oxide, tin oxide, antimony trioxide, carbon black and molybdenum disulfide; and organic particles of the compounds such as acrylic cross-linked polymers, styrene-based cross-linked polymers, silicone resin, fluororesin, benzoguanamine resin, phenolic resin, nylon resin and polyethylene wax.

In the mold release film of the present invention, the resin layer includes 100 parts by mass of the polypropylene-based modified polyolefin resin with the proportion of a modifying component of 1 to 10% by mass and 1 to 50 parts by mass of a cross-linking agent, and hence the peel strength between the resin layer and the pressure-sensitive adhesive measured by bonding a rubber-based adhesive as a pressure-sensitive adhesive material to the resin layer can be made to exceed 3.0 N/cm, and can be made to be preferably 3.0 to 5.5 N/cm and more preferably 3.5 to 5.0 N/cm. When the peel strength is 3.0 N/cm or less, no sufficient adhesiveness between the resin layer and the pressure-sensitive adhesive is obtained, and the peeling off of the resin layer and the pressure-sensitive adhesive from each other possibly occurs during the storage, cutting and transportation of the mold release film.

The mold release film of the present invention allows the resin layer components to hardly migrate into the pressure-sensitive adhesive material, and hence an acrylic pressure-sensitive adhesive as a pressure-sensitive adhesive material exhibits small decrease of the peel strength of the pressure-sensitive adhesive even after being bonded to the resin layer, and the residual adhesion rate of the pressure-sensitive adhesive can be made to be 80% or more, preferably 82% or more and more preferably 85% or more.

When the surface of the acrylic pressure-sensitive adhesive as a pressure-sensitive adhesive material is contaminated by the resin layer of the mold release film, the pressure-sensitive re-adhesiveness of the pressure-sensitive adhesive material is degraded, and the performances as a pressure-sensitive adhesive material are impaired. Accordingly, the higher the residual adhesion rate is, the more preferable it is.

The mold release film of the present invention allows the resin layer components to hardly migrate into the materials other than the pressure-sensitive adhesive material, and hence the opposite surface to the surface provided with the resin layer is not contaminated by the resin layer even when the mold release film is wound in a form of a roll. When the opposite surface to the surface provided with the resin layer is contaminated by the resin layer, the contact angle of the opposite surface is increased. Specifically, the contact angle of water on the surface of the substrate polyester film is 60 to 70°, the contact angle on the resin layer surface is 90 to 100°; when the opposite surface to the surface provided with the resin layer is contaminated by the resin layer, the contact angle on the opposite surface is increased from 60 to 70° and approaches 90 to 100°. In the present invention, the resin layer does not cause contamination, and hence, even when the mold release film is wound in a form of a roll, the contact angle of water on the opposite surface to the surface provided with the resin layer can be made to be 80° or less. When the contact angle on the opposite surface is 80° or less, the opposite surface of the film can be regarded as not being contaminated, the contact angle being preferably 75° or less; when the contact angle exceeds 80°, the opposite surface of the film is contaminated, and the processing steps are possibly contaminated.

In the present invention, the thickness of the resin layer is preferably in a range from 0.01 to 1 μm, more preferably 0.03 to 0.7 μm and furthermore preferably 0.05 to 0.5 μm. When the thickness of the resin layer is less than 0.01 μm, no sufficient mold releasability is obtained, and when the thickness of the resin layer exceeds 1 μm, the mold releasability is saturated without being improved, and moreover, the residual adhesion rate is sometimes decreased.

In the present invention, the polyester constituting the polyester film is a linear saturated polyester synthesized from an aromatic dibasic acid or an ester-forming derivative of the aromatic dibasic acid and a diol or an ester-forming derivative of the diol.

Specific preferable examples of such a polyester include: polyesters such as polyethylene terephthalate, polyethylene isophthalate, polytetramethylene terephthalate, poly(1,4-cyclohexylene dimethylene terephthalate) and polyethylene-2,6-naphthalate, and the copolymers of these polyesters.

Examples of the component capable of constituting the copolymers are not particularly limited. Examples of the acid component include: dicarboxylic acids such as isophthalic acid, phthalic acid, 2,6-naphthalene dicarboxylic acid, sodium 5-sulfoisophthalate, oxalic acid, succinic acid, adipic acid, sebacic acid, azelaic acid, dodecanedioic acid, dimer acid, maleic anhydride, maleic acid, fumaric acid, itaconic acid, citraconic acid, mesaconic acid and cyclohexanedicarboxylic acid; and 4-hydroxybenzoic acid, c-caprolactone and lactic acid.

Examples of the alcohol component include: ethylene glycol, diethylene glycol, 1,3-propanediol, neopentyl glycol, 1,6-hexanediol, cyclohexanedimethanol, triethylene glycol, polyethylene glycol, polypropylene glycol, polytetramethylene glycol, and ethylene oxide adducts of bisphenol A and bisphenol S.

Additionally, trifunctional compounds and the like such as trimellitic acid, trimesic acid, pyromellitic acid, trimethylolpropane, glycerin and pentaerythritol may also be used in small amounts.

These copolymerization components may be used in combinations of two or more thereof. Blends of two or more polyesters may also be used.

In the present invention, polyesters such as polyethylene terephthalate and polyethylene-2,6-naphthalate are particularly preferable.

The intrinsic viscosity of the polyester is preferably 0.55 to 0.80 and more preferably 0.60 to 0.75. When the intrinsic viscosity is less than the foregoing range, the breakage of the film tends to occur during production of a film, stable production of the film is difficult, and the strength of the obtained film is low. On the other hand, when the intrinsic viscosity exceeds the foregoing range, the shear heat is generated in a large amount during the melt extrusion of the resin in the production process of the film, thermally decomposed and gelled substances are increased, thus surface defects, surface foreign substances and surface coarse protrusions are increased, the load exerted on the extruder is large, and the productivity of the film is degraded in such a way that the production rate has to be sacrificed and the control of the film thickness is made difficult. The polyester having too high intrinsic viscosity involves a long polymerization time or a long polymerization process so as to be a factor to raise the cost.

Examples of the polymerization method of polyester include, without being particularly limited to, a transesterification method and a direct polymerization method. Examples of the transesterification catalyst include compounds such as the oxides and acetate of Mg, Mn, Zn, Ca, Li and Ti. Examples of the polycondensation catalyst include compounds such as oxides and acetates of Sb, Ti and Ge.

The polyester after the polymerization includes monomers, oligomers, and by-products such as acetaldehyde, and hence a solid phase polymerization may also be performed under reduced pressure or in an inert gas flow at a temperature equal to or higher than 200° C.

In the polymerization of polyester, if necessary, additives such as an antioxidant, a heat stabilizer, an ultraviolet absorber, an antistatic agent and a pinning agent can be added. Examples of the antioxidant include hindered phenol-based compounds and hindered amine-based compounds; examples of the heat stabilizer include phosphorus-based compounds; examples of the ultraviolet absorber include benzophenone-based compounds and benzotriazole-based compounds.

A surface roughening substance may also be included in the polyester, and the maximum particle size of the surface roughening substance is preferably 0.2 μm or less. Examples of the surface roughening substance include: particles of inorganic substances such as silicon dioxide, calcium carbonate, kaolinite, titanium dioxide and silica-alumina; and particles of organic substances such as silicone, polymethyl methacrylate and ethylvinylbenzene. The surface roughening substances can be used each alone or in combinations of two or more thereof.

The mold release film of the present invention includes as the substrate film thereof the polyester film constituted with the above-described polyester, and can be industrially simply obtained by providing the resin layer on the polyester film by applying a liquid material including the polypropylene-based modified polyolefin resin and a cross-linking agent in a liquid medium to the polyester film, and by drying, stretching and heat treating the polyester film including the liquid material applied thereto.

In the present invention, the liquid medium constituting the liquid material for forming the resin layer is preferably an aqueous medium. The aqueous medium means a solvent including water and an amphiphilic organic solvent and having a content of water of 2% by mass or more, and may also be a solvent composed only of water.

The amphiphilic organic solvent means an organic solvent for which the solubility of water at 20° C. is 5% by mass or more (The solubilities of water at 20° C. in organic solvents are described in the documents such as "Handbook of Solvents," (10th Ed., Kodansha Scientific, 1990)).

Specific examples of the amphiphilic organic solvent may include: alcohols such as methanol, ethanol, n-propanol and isopropanol; ethers such as tetrahydrofuran and 1,4-dioxane; ketones such as acetone and methyl ethyl ketone; esters such as methyl acetate, n-propyl acetate, isopropyl acetate, methyl propionate, ethyl propionate and dimethyl carbonate; derivatives of ethylene glycol such as ethylene glycol n-butyl ether; additionally, ammonia and organic amine compounds such as diethylamine, triethylamine, diethanolamine, triethanolamine, N,N-dimethyl ethanolamine and N,N-diethyl ethanolamine; and lactams such as 2-pyrrolidone and N-methyl-2-pyrrolidone.

The liquid material for forming the resin layer can be prepared by adding a cross-linking agent to a liquid material of the polypropylene-based modified polyolefin resin.

As the liquid material of the polypropylene-based modified polyolefin resin, an aqueous dispersion of the polypropylene-based modified polyolefin resin can be used. Examples of the method for dispersing the polypropylene-based modified polyolefin resin in an aqueous medium include, without being particularly limited to, a method described in International Publication No. WO 02/055598.

From the viewpoint of the stability at the time of mixing with other components and the storage stability after mixing, the dispersed particle size of the polypropylene-based modified polyolefin resin in an aqueous medium is, in terms of the number average particle size, preferably 1 μm or less and more preferably 0.8 μm or less. Such a particle size can be attained by the production method described in International Publication WO 02/055598. The number average particle size of the polypropylene-based modified polyolefin resin is measured by a dynamic light scattering method.

The solid content concentration of the aqueous dispersion of the polypropylene-based modified polyolefin resin is, without being particularly limited to, preferably 1 to 60% by mass and more preferably 5 to 30% by mass, for the purpose of appropriately maintaining the viscosity of the aqueous dispersion.

The solid content concentration of the liquid material for forming the resin layer obtained by mixing the aqueous dispersion of the polypropylene-based modified polyolefin resin and a cross-linking agent can be appropriately selected according to, for example, the lamination conditions, the intended thickness and the intended performances, and is not particularly limited. However, the solid content concentration of the liquid material for forming the resin layer is preferably 2 to 30% by mass and more preferably 3 to 20% by mass for the purpose of maintaining the viscosity of the liquid material at an appropriate value and forming a uniform resin layer.

To the liquid material for forming the resin layer, additives such as an antioxidant, an ultraviolet absorber, a lubricant and a colorant can be added, within ranges not impairing the performances of the liquid material.

In the present invention, examples of the method for applying the liquid material for forming the resin layer to a polyester film may include heretofore known methods such as gravure roll coating, reverse roll coating, wire bar coating, lip coating, air knife coating, curtain flow coating, spray coating, immersion coating and brush coating.

In the present invention, it is necessary to include the step of applying (inline coating) the liquid material for forming the resin layer during the production process of the polyester film, and the steps of drying, stretching and heat treating the liquid material for forming the resin layer along with the polyester film. The application during the production process allows the resin layer to be formed in a state of being small in the orientational crystallization degree of the polyester film surface, and hence the adhesive force between the polyester film and the resin layer is improved. As compared to the offline application (post-coating), the resin layer can be heat treated at a higher temperature with the polyester film being in a tense state, and hence the mold releasability and the residual adhesive force can be improved, without degrading the quality of the polyester film. Moreover, in this way of application, as compared to offline application, the production process can be simplified, and is additionally advantageous with respect to the cost because of being capable of forming a thinner resin layer through stretching after application.

Next, an example of the method for producing the mold release film of the present invention is described.

First, a sufficiently dried polyester is fed to an extruder, melted at a temperature equal to or higher than the temperature at which the polyester is sufficiently plasticized and exhibits fluidity, if necessary, allowed to pass through a selected filter, and then extruded through a T-die into a sheet shape. The resulting sheet is brought into close contact with a cooling drum regulated at a temperature equal to or lower than the glass transition temperature (Tg) of the polyester, to yield an unstretched film.

The obtained unstretched film is biaxially stretched to be biaxially oriented. The stretching method is not particularly limited; a polyester film can be produced by using a successive biaxial stretching method or a simultaneous biaxial stretching method.

The mold release film of the present invention is produced by applying the liquid material for forming the resin layer during the production process of the polyester film and by drying, stretching and heat treating the applied liquid material along with the polyester film.

In the simultaneous biaxial stretching method, the liquid material is applied to the unstretched film and dried, and then the unstretched film is biaxially stretched in a temperature range from the Tg of the polyester to a temperature higher than the Tg of the polyester by 50° C., both in the lengthwise direction and in the widthwise direction, with a stretching magnification of approximately 2 to 4 in each of both directions. Before the unstretched film is introduced into a simultaneous biaxial stretching machine, the unstretched film may be subjected to a preliminary longitudinal stretching with a stretching magnification of at most approximately 1.2.

In the successive biaxial stretching method, the unstretched film is heated with, for example, a roll or infrared ray and stretched in the lengthwise direction to yield a longitudinally stretched film. The stretching is preferably performed by taking advantage of the circumferential speed differences between two or more rolls, in a temperature range from the Tg of the polyester to a temperature higher than the Tg of the polyester by 40° C., with a magnification of 2.5 to 4.0. The longitudinally stretched film is successively, continuously and sequentially subjected to the treatments of transverse stretching in the widthwise direction, heat fixation, and thermal relaxation, to yield a biaxially oriented film. The transverse stretching is preferably started at a temperature falling within the range from the Tg of the polyester to a temperature higher than the Tg of the polyester by 40° C., and the maximum temperature is preferably a temperature lower than the melting point (Tm) of the polyester by (100 to 40)° C. The magnification of the transverse stretching is regulated according to the physical properties required for the final film, and is preferably 3.5 or more, or 3.8 or more and more preferably 4.0 or more. The modulus of elasticity of the film or the dimensional stability of the film can also be enhanced by further stretching again in the lengthwise direction and/or the widthwise direction after the stretching in the lengthwise direction and the stretching in the widthwise direction.

When the mold release film is produced by the successive biaxial stretching method, the following two methods are available: a method in which the liquid material is applied to the unstretched film, and then the unstretched film is longitudinally stretched and transversely stretched; and a method in which the liquid material is applied to the longitudinally stretched film, and then the longitudinally stretched film is transversely stretched. Because of the reasons related to simplicity and operations, the latter method is preferable.

Following the stretching, a heat fixation treatment is preferably performed for a few seconds at a temperature lower than the Tm of the polyester by (50 to 10)° C., and at the same time as the heat fixation treatment, a relaxation of 2 to 10% is preferably performed in the widthwise direction of the film. After the heat fixation treatment, the film is cooled to a temperature equal to or lower than the Tg of the film to yield a biaxially stretched film provided with the resin layer.

A single layer film in which the polyester film of the substrate is composed of one type of layer is obtained by the above-described production method; however, the polyester film of the substrate preferably has a multilayer structure formed by laminating two or more types of layers. By allowing the polyester film to have a multilayer structure, the surface roughness of each of the respective surfaces of the polyester film can be independently controlled.

When a multilayer film is used as the substrate polyester film, of the outer layers of the multilayer film, the layer having the resin layer provided thereon preferably does not contain the surface roughening substance. No inclusion of the surface roughening substance in the layer having the resin layer provided thereon results in no bleeding out of the surface roughening substance to the interface with the resin layer and to the resin layer surface, and can prevent the degradation of the adhesiveness between the resin layer and the substrate film and the contamination of the adherend at the time of peeling off.

In the foregoing production method, the film having the multilayer structure can be produced by, for example, a method in which the polyesters constituting the respective layers are separately melted and extruded through a multilayer die, and the resulting layers are laminated on and fused to each other before being solidified, then biaxially stretched and heat-fixed, or a method in which two or more types of polyesters are separately melted and extruded into films, and the resulting films are laminated on and fused to each other in a state of being unstretched or after stretching. From the viewpoint of the simplicity of the process, it is preferable that a multilayer die be used, and the resulting layers be laminated on and fused to each other before being solidified.

The mold release film of the present invention has satisfactory mold releasability with respect to pressure-sensitive adhesive materials, and hence lamination of a pressure-sensitive adhesive material on the resin layer of the mold release film allows a laminate to be formed.

EXAMPLES

Hereinafter, the present invention is described specifically with reference to Examples, but the present invention is not limited by these Examples. The properties of the modified polyolefin resin, the aqueous dispersion of the modified polyolefin resin and the mold release film were measured by the following methods.

(1) Constitution of Modified Polyolefin Resin

The constitution of a modified polyolefin resin was determined by using ortho-dichlorobenzene ($d_4$) as the solvent, and by performing at 120° C. a $^1$H-NMR analysis (GEMINI 2000/300, 300 MHz, manufactured by Varian, Inc.).

(2) Organic Solvent Content in Aqueous Dispersion

The organic solvent content in an aqueous dispersion was determined by using the gas chromatograph GC-8A manufactured by Shimadzu Corp., and by directly placing an aqueous dispersion or a sample prepared by diluting the aqueous dispersion with water in the gas chromatograph. The detection limit was 0.01% by mass.

The detailed conditions for the Gas Chromatography were as follows.

Detector: FID, Carrier gas: Nitrogen, Column packing substance: PEG-HT (5%)-Uniport HP (60/80 mesh) (manufactured by GL Sciences Inc.), Column size: 3 mm in diameter×3 m, Sample placement temperature (injection temperature): 180° C., Column temperature: 80° C., Internal standard substance: n-Butanol (3) Solid Content Concentration of Aqueous Dispersion An appropriate amount of an aqueous dispersion was weighed, the weighed sample was heated at 150° C. until the mass of the residue (solid content) reached a constant value, and thus, the solid content concentration was determined.

(4) Number Average Particle Size of Polyolefin Resin Particles

By using a Microtrac particle size distribution analyzer UPA 150 (Model No. 9340, dynamic light scattering method) manufactured by Nikkiso Co., Ltd., the number average particle size was determined. The refractive index of the resin used for the derivation of the particle size was 1.50.

(5) Rubber-Based Pressure-Sensitive Adhesive Peel Strength

Onto the resin layer of the mold release film, a pressure-sensitive adhesive tape (LP-24/rubber-based pressure-sensitive adhesive, manufactured by Nichiban Co, Ltd.) of 24 mm in width and 150 mm in length was compression bonded with a rubber roll to prepare a sample. The sample was interposed in a form of metal plate/rubber plate/sample/rubber plate/metal plate, allowed to stand under a load of 2 kPa in an atmosphere set at 70° C. for 20 hours, and then cooled for 30 minutes or more so as to get back to normal temperature, and thus a sample for peel strength measurement was obtained. The peel strength between the pressure-sensitive adhesive tape and the mold release film in the sample for peel strength measurement was measured in a thermostatic room set at 25° C. with a tensile tester (a precise universal material testing machine, model 2020, manufactured by Intesco Co., Ltd.). The peel angle was set at 180° and the peel speed was set at 300 mm/min.

(6) Acrylic Pressure-Sensitive Adhesive Peel Strength

Onto the resin layer of the mold release film, a pressure-sensitive adhesive polyester tape (No. 31B/acrylic pressure-sensitive adhesive, manufactured by Nitto Denko Corp.) of 50 mm in width and 150 mm in length was compression bonded with a rubber roll to prepare a sample. The sample was interposed in a form of metal plate/rubber plate/sample/rubber plate/metal plate, allowed to stand under a load of 2 kPa in an atmosphere set at 70° C. for 20 hours, and then cooled for 30 minutes or more so as to get back to normal temperature, and thus a sample for peel strength measurement was obtained. The peel strength between the pressure-sensitive adhesive tape and the mold release film in the sample for peel strength measurement was measured in a thermostatic room set at 25° C. with a tensile tester (a precise universal material testing machine, model 2020, manufactured by Intesco Co., Ltd.). The peel angle was set at 180° and the peel speed was set at 300 mm/min.

(7) Residual Adhesion Rate

The polyester pressure-sensitive adhesive tape (No. 31B/acrylic pressure-sensitive adhesive, manufactured by Nitto Denko Corp.) of 50 mm in width and 150 mm in length, peeled off from the mold release film surface in the test of the (6) acrylic pressure-sensitive adhesive peel strength was bonded to the corona-treated surface of a biaxially stretched polyester resin film ("Emblet PET-12," thickness: 12 m, manufactured by Unitika Ltd.), and allowed to stand under a load of 2 kPa at room temperature for 20 hours. Then, the peel strength between the polyester pressure-sensitive adhesive tape and the biaxially stretched polyester resin film was measured in a thermostatic room set at 25° C. with the tensile tester (a precise universal material testing machine, model 2020, manufactured by Intesco Co., Ltd.). The peel angle was set at 180° and the peel speed was set at 300 mm/min. The peel strength obtained by this measurement was defined as F1.

On the other hand, a fresh polyester pressure-sensitive adhesive tape (No. 31B/acrylic pressure-sensitive adhesive, manufactured by Nitto Denko Corp.) of 50 mm in width and 150 mm in length was bonded to the corona-treated surface of a biaxially stretched polyester resin film ("Emblet PET-12," thickness: 12 μm, manufactured by Unitika Ltd.), and allowed to stand under a load of 2 kPa at room temperature for 20 hours. Subsequently, the peel strength between the polyester pressure-sensitive adhesive tape and the biaxially stretched polyester resin film was measured (peel angle: 180 degrees, peel speed: 300 mm/min) in a thermostatic room set at 25° C. with the tensile tester (a precise universal material testing machine, model 2020, manufactured by Intesco Co., Ltd.), and the obtained peel strength was defined as F2.

From the obtained peel strengths F1 and F2, the residual adhesion rate was obtained by using the following formula:

Residual adhesion rate (%)=(F1/F2)×100

(8) Contact Angle

A roll formed by winding the obtained mold release film was allowed to stand still in an environment at 40° C. for 3 days. After completion of the treatment, the roll was cooled, the surface layer film was removed, for each of the resin layer side surface and the opposite surface to the resin layer side surface, in the mold release film portion at a position separated by 50 m from the winding core, the contact angle with water was measured with a liquid drop method. Specifically, in an environment at 20° C. and 65% RH, by using the contact angle meter CA-D manufactured by Kyowa Interface Science Co., Ltd., a drop of pure water was placed at a prescribed area in the meter so as to have a diameter of 2.0 mm, and the contact angle after the elapsed time of 10 seconds was measured. The average value of the results obtained by five runs of measurement was adopted.

The modified polyolefin resin aqueous dispersions for preparing the liquid materials for forming the resin layer were produced by the following methods.

<Production of Polypropylene-Based Modified Polyolefin Resin P-1>

In a four-necked flask, in a nitrogen atmosphere, 280 g of a propylene-butene-ethylene ternary copolymer (Vestoplast 708, propylene/butene/ethylene=64.8/23.9/11.3 (% by mass), manufactured by Huels Japan Ltd.) was heated and melted, then, 32.0 g of maleic anhydride as an unsaturated carboxylic acid and 6.0 g of dicumyl peroxide as a radical generator were respectively added to the molten copolymer over 1 hour under stirring while the reaction system temperature was being maintained at 170° C., and then the reaction mixture was allowed to react for 1 hour. After completion of the reaction, the obtained reaction product was placed in a large amount of acetone to precipitate the resin. The resin was further washed with acetone several times to remove the unreacted maleic anhydride, and then dried under reduced pressure in a reduced pressure dryer to yield a polypropylene-based modified polyolefin resin P-1.

<Production of Polypropylene-Based Modified Polyolefin Resin P-2>

In a four-necked flask, in a nitrogen atmosphere, 280 g of a propylene-ethylene copolymer (propylene/ethylene=81.8/18.2 (% by mass), weight average molecular weight: 85,000) was heated and melted, then, 35.0 g of maleic anhydride as an unsaturated carboxylic acid and 6.0 g of di-t-butyl peroxide as a radical generator were respectively added to the molten copolymer over 2 hours under stirring while the reaction system temperature was being maintained at 180° C., and then the reaction mixture was allowed to react for 1 hour. After completion of the reaction, the obtained reaction product was placed in a large amount of acetone to precipitate the resin. The resin was further washed with acetone several times to remove the unreacted maleic anhydride, and then dried under reduced pressure in a reduced pressure dryer to yield a polypropylene-based modified polyolefin resin P-2.

[Production of Polypropylene-Based Modified Polyolefin Resin Aqueous Dispersion E-1]

By using a stirrer equipped with a hermetically sealable, pressure-proof 1-liter volume glass vessel with a heater attached thereto, 60.0 g of the polypropylene-based modified polyolefin resin (P-1), 45.0 g of ethylene glycol-n-butyl ether (Bu-EG, boiling point: 171° C.) and 6.9 g of N,N-dimethylethanolamine (DMEA, boiling point: 134° C., 1.0 equivalent in relation to the carboxyl group of the maleic anhydride unit in the resin) and 188.1 g of distilled water were placed in the glass vessel, and the resulting mixture was stirred by setting the rotation speed of the stirrer blades at 300 rpm. Consequently, no precipitate of the resin was found at the vessel bottom, and the resin was verified to be in a suspended state. Then, while this state was being maintained, the mixture was heated after an elapsed time of 10 minutes by turning on the power source of the heater. Then, while the system temperature was being maintained at 140° C., the mixture was further stirred for 60 minutes. Subsequently, the mixture was cooled by air cooling down to room temperature (approximately 25° C.) while being stirred at a rotation speed still set at 300 rpm. The mixture was filtered under pressure (air pressure: 0.2 MPa) with a 300-mesh stainless steel filter (wire diameter: 0.035 mm, plain weave), and thus, a milk-white-yellow uniform polypropylene-based modified polyolefin resin aqueous dispersion E-1 was obtained. On the filter, the residual resin was little found.

[Production of Polypropylene-Based Modified Polyolefin Resin Aqueous Dispersion E-2]

P-2 was used as a polypropylene-based modified polyolefin resin. Otherwise in the same manner as for the aqueous dispersion E-1, a polypropylene-based modified polyolefin resin aqueous dispersion E-2 was obtained.

[Production of Polypropylene-Based Modified Polyolefin Resin Aqueous Dispersion E-3]

In a 0.5-L two-necked round-bottom flask, 250 g of the polypropylene-based modified polyolefin resin aqueous dispersion E-1 and 90 g of distilled water were placed, a mechanical stirrer and a Liebig condenser were equipped, and then the flask was heated by using an oil bath to distill off the aqueous medium. When approximately 90 g of water and Bu-EG were distilled off, the heating was terminated and the flask was cooled down to room temperature. After cooling, the liquid component in the flask was filtered under pressure (air pressure: 0.2 MPa) with a 300-mesh stainless steel filter (wire diameter: 0.035 mm, plain weave), and thus, a milk-white uniform polypropylene-based modified polyolefin resin aqueous dispersion E-3 was obtained. The organic solvent content in the aqueous dispersion was 2% by mass.

[Production of Polyethylene-Based Modified Polyolefin Resin Aqueous Dispersion E-4]

By using a stirrer equipped with a hermetically sealable, pressure-proof 1-liter volume glass vessel with a heater attached thereto, 60.0 g of a maleic anhydride-modified polyolefin resin (Bondine LX-4110, manufactured by Arkema Inc.), 90.0 g of isopropanol (IPA), 3.0 g of triethylamine (TEA) and 147.0 g of distilled water were placed in the glass vessel, and the resulting mixture was stirred for 30 minutes by setting the rotation speed of the stirrer blades at 300 rpm and maintaining the temperature in the system at 140 to 145° C. Subsequently, the glass vessel was immersed in a water bath, and the mixture was cooled down to room temperature (approximately 25° C.) while being stirred at a rotation speed still set at 300 rpm, and then the mixture was filtered under pressure (air pressure: 0.2 MPa) with a 300-mesh stainless steel filter (wire diameter: 0.035 mm, plain weave), and thus, a milk-white uniform polyethylene-based modified polyolefin resin aqueous dispersion E-4 was obtained.

[Production of Polyethylene-Based Modified Polyolefin Resin Aqueous Dispersion E-5]

By using a stirrer equipped with a hermetically sealable, pressure-proof 1-liter volume glass vessel with a heater attached thereto, 60.0 g of a maleic anhydride-modified polyolefin resin (Bondine HX-8210, manufactured by Arkema Inc.), 90.0 g of IPA, 3.0 g of TEA and 147.0 g of distilled water were placed in the glass vessel, and the resulting mixture was stirred for 30 minutes by setting the rotation speed of the stirrer blades at 300 rpm and maintaining the temperature in the system at 140 to 145° C. Subsequently, the glass vessel was immersed in a water bath, and the mixture was cooled down to room temperature (approximately 25° C.) while being stirred at a rotation speed still set at 300 rpm.

In a 0.5-L two-necked round-bottom flask, the obtained aqueous dispersion, 180 g of distilled water and 3.0 g of DMEA were placed, a mechanical stirrer and a Liebig condenser were equipped, and then the flask was heated by using an oil bath to distill off the aqueous medium. When approximately 180 g of water and IPA were distilled off, the heating was terminated and the flask was cooled down to room temperature. After cooling, the liquid component in the flask was filtered under pressure (air pressure: 0.2 MPa) with a 300-mesh stainless steel filter (wire diameter: 0.035 mm, plain weave), and thus, a polyethylene-based modified polyolefin resin aqueous dispersion E-5 was obtained.

[Production of Polyethylene-Based Modified Polyolefin Resin Aqueous Dispersion E-6]

By using a stirrer equipped with a hermetically sealable, pressure-proof 1-liter volume glass vessel with a heater attached thereto, 60.0 g of acrylic acid-modified polyolefin resin (Primacor 59081 manufactured by Dow Chemical Co.), 16.8 g of TEA and 223.2 g of distilled water were placed in the glass vessel, and the resulting mixture was stirred for 30 minutes by setting the rotation speed of the stirrer blades at 300 rpm and maintaining the temperature in the system at 140 to 145° C. Subsequently, the glass vessel was immersed in a water bath, and the mixture was cooled down to room temperature (approximately 25° C.) while being stirred at a rotation speed still set at 300 rpm. The mixture was filtered under pressure (air pressure: 0.2 MPa) with a 300-mesh stainless steel filter (wire diameter: 0.035 mm, plain weave), and thus, a light milk-white aqueous dispersion E-6 was obtained. In this case, almost no resin remained on the filter.

Table 1 shows the constitutions and physical properties of the modified polyolefin resins, and the physical properties of the obtained aqueous dispersions.

TABLE 1

| Type of aqueous dispersion | Type | Modified polyolefin resin Constitution (% by mass) | | | | | Solid content concentration (% by mass) | Number average particle size (μm) | Liquid medium Organic solvent | |
|---|---|---|---|---|---|---|---|---|---|---|
| | | Propylene | Butene | Ethylene | Maleic anhydride | Ethyl acrylate | | | Type | Content (% by mass) |
| E-1 | P-1 | 60.7 | 22.4 | 10.2 | 6.3 | 0 | 20 | 0.08 | Bu-EG/DMEA | 17 |
| E-2 | P-2 | 75.4 | 0 | 16.8 | 7.8 | 0 | 20 | 0.09 | Bu-EG/DMEA | 17 |
| E-3 | P-1 | 60.7 | 22.4 | 10.2 | 6.3 | 0 | 20 | 0.08 | DMEA | 2 |
| E-4 | LX-4110 | 0 | 0 | 91.0 | 2.0 | 7.0 | 20 | 0.08 | IPA/TEA | 31 |
| E-5 | HX-8210 | 0 | 0 | 91.0 | 3.0 | 6.0 | 20 | 0.06 | DMEA | 1 |
| E-6 | 59801 | 0 | 0 | 80.0 | 0.0 | 20.0 | 20 | 0.02 | TEA | 6 |

Example 1

<Preparation of Liquid Material for Forming Resin Layer>

The polypropylene-based modified polyolefin resin aqueous dispersion E-1, a polyvinyl alcohol aqueous solution (VC-10, degree of polymerization: 1,000, solid content concentration: 8% by mass, manufactured by Japan Vam & Poval Co., Ltd.) and an oxazoline compound aqueous solution (Epocros WS-700, solid content concentration: 25% by mass, manufactured by Nippon Shokubai Co., Ltd.) as a cross-linking agent were mixed in such a way that the solid content ratio between the respective components was the value shown in Table 3, and thus a liquid material was obtained.

<Production of Mold Release Film>

The polyethylene terephthalate (polymerization catalyst: antimony trioxide, intrinsic viscosity: 0.62, glass transition temperature: 78° C., melting point: 255° C.) B including a silica particle as added thereto was placed in an extruder I (screw diameter: 50 mm), and the polyethylene terephthalate A including a silica particle as added thereto was placed in an extruder II (screw diameter: 65 mm), both being shown in Table 2, were respectively melted at 280° C., and then the respective melts were made to join together into a layer shape before reaching a T-die outlet. The laminated layer was extruded from a T-die outlet by regulating in such a way that the layer thickness ratio (I/II) was 4/6 and the total thickness was 380 μm, and rapidly cooled and solidified, and thus an unstretched film was obtained. The unstretched film was stretched with a magnification of 3.5 by using a roll-type longitudinal stretching machine under a condition of 85° C.

Next, the liquid material for forming the resin layer prepared by the above-described method was applied to the surface of the polyester film layer from the extruder I with a 120-mesh gravure roll so as for the coating amount to be 5 g/m², and the stretched film coated with the liquid material was made to pass through a hot air drying furnace set at 50° C. for a period of 20 seconds.

Subsequently, the film edges were continuously gripped with the clips of a flat-type stretching machine, the film was transversely stretched with a magnification of 4.5 under a condition of 100° C., then heat treated with a transverse relaxation rate of 3% at 230° C. for 3 seconds, and thus there was obtained a 25-μm-thick mold release film in which a resin layer is provided on one surface of a two-type two-layer polyester film.

By using a contact pressure roll (maximum height SRmax was 7 μm) provided with hard chrome plating on the surface thereof, the obtained mold release film was wound around a paper pipe of 10.5 cm in outer diameter in a form of a roll having a film length of 500 m under the conditions that the width was 800 mm, the winding tension was 118 N/m, the winding contact pressure was 118 N/m and the winding speed was 100 m/min. The coefficient of friction of the contact pressure roll was 0.3 and the oblique angle of the film was set at 120°.

TABLE 2

| | | Silica particle | |
|---|---|---|---|
| | | Particle size (μm) | Addition amount (wt %) |
| Polyethylene terephthalates | A | 2.3 | 0.07 |
| | B | 1.2 | 0.05 |
| | C | 0.6 | 0.05 |
| | D | — | 0 |

Examples 2 to 15 and Comparative Examples 4 to 9

In each of Examples 2 to 15 and Comparative Examples 4 to 9, a mold release film was obtained by performing the same operations as in Example 1 except that when a two-type three-layer polyester film was adopted, the layer thickness ratio (I/II/I) was altered to 2/6/2; when a single layer polyester film was adopted, the layer thickness ratio (I/II) was altered to 10/0; and the types of the resins and the composition of the liquid material for forming the resin layer, to form the respective layers of the film, were altered as described in Table 3.

Comparative Example 1

The liquid material for forming the resin layer prepared in Example 1 was applied by using a Meyer bar to the corona-treated surface of a biaxially stretched polyester film (Emblet PET-38, thickness: 38 μm, manufactured by Unitika Ltd.), and then the film was dried at 120° C. for 30 seconds to form a 0.5-μm-thick resin layer on the film, and subsequently subjected to aging at 50° C. for 2 days to yield a mold release film.

Comparative Examples 2 and 3

In each of Comparative Examples 2 and 3, a mold release film was obtained by performing the same operations as in Comparative Example 1 except that the composition of the liquid material for forming the resin layer was altered to the composition described in Table 3.

Table 3 shows the compositions of the liquid materials for forming the resin layer used in Examples 1 to 15 and Comparative Examples 1 to 9, and the properties of the mold release films of Examples 1 to 15 and Comparative Examples 1 to 9.

TABLE 3

| | | Polyester film | | | Liquid material for forming resin layer | | | | |
|---|---|---|---|---|---|---|---|---|---|
| | | Type of resin for forming layer | | | | | | | |
| | | Resin layer forming | Intermediate | Opposite | Modified polyolefin resin aqueous dispersion | | Cross-linking agent | Poly-vinyl alcohol | Solid content concentration |
| | Type | layer | layer | layer | Type | Type of olefin | parts* | parts* | (%) |
| Example | 1 Two types/two layers | B | — | A | E-1 | Polypropylene-based | 10 | 50 | 8 |
| | 2 Two types/two layers | B | — | A | E-1 | Polypropylene-based | 10 | 10 | 6 |

TABLE 3-continued

| | | | | | | | | | | |
|---|---|---|---|---|---|---|---|---|---|---|
| | 3 | Two types/two layers | B | — | A | E-1 | Polypropylene-based | 10 | 300 | 10 |
| | 4 | Two types/two layers | B | — | A | E-1 | Polypropylene-based | 10 | 1000 | 8 |
| | 5 | Two types/two layers | B | — | A | E-1 | Polypropylene-based | 10 | 1500 | 8 |
| | 6 | Two types/two layers | B | — | A | E-2 | Polypropylene-based | 10 | 50 | 8 |
| | 7 | Two types/two layers | B | — | A | E-2 | Polypropylene-based | 10 | 100 | 8 |
| | 8 | Two types/two layers | B | — | A | E-3 | Polypropylene-based | 10 | 50 | 8 |
| | 9 | Two types/two layers | C | — | A | E-1 | Polypropylene-based | 5 | 50 | 6 |
| | 10 | Two types/two layers | C | — | A | E-1 | Polypropylene-based | 50 | 50 | 15 |
| | 11 | Two types/two layers | D | — | A | E-1 | Polypropylene-based | 10 | 50 | 8 |
| | 12 | Two types/three layers | A | D | A | E-1 | Polypropylene-based | 1 | 50 | 8 |
| | 13 | Two types/three layers | A | D | A | E-1 | Polypropylene-based | 5 | 0 | 8 |
| | 14 | Two types/three layers | A | D | A | E-1 | Polypropylene-based | 10 | 50 | 8 |
| | 15 | Single layer | | | A | E-1 | Polypropylene-based | 10 | 50 | 8 |
| Comparative Examples | 1 | Single layer | | | A | E-1 | Polypropylene-based | 10 | 50 | 8 |
| | 2 | Single layer | | | A | E-1 | Polypropylene-based | 10 | 300 | 10 |
| | 3 | Single layer | | | A | E-2 | Polypropylene-based | 10 | 50 | 8 |
| | 4 | Two types/two layers | B | — | A | E-4 | Polyethylene-based | 10 | 40 | 8 |
| | 5 | Two types/two layers | B | — | A | E-4 | Polyethylene-based | 5 | 200 | 8 |
| | 6 | Two types/two layers | B | — | A | E-5 | Polyethylene-based | 5 | 40 | 8 |
| | 7 | Two types/two layers | B | — | A | E-6 | Polyethylene-based | 5 | 40 | 10 |
| | 8 | Two types/two layers | B | — | A | E-1 | Polypropylene-based | 0 | 0 | 8 |
| | 9 | Two types/three layers | A | D | A | E-1 | Polypropylene-based | 100 | 50 | 8 |

| | | | | Properties of mold release film | | | | | |
|---|---|---|---|---|---|---|---|---|---|
| | | | | | Resin layer surface | | | | Acrylic pressure-sensitive adhesive Residual adhesion rate (%) |
| | | | Application or non-application of stretching after application of liquid material | Resin layer thickness (μm) | Peel strength | | Contact angle (°) | Opposite surface Contact angle (°) | |
| | | | | | Rubber-based pressure-sensitive adhesive (N/cm) | Acrylic pressure-sensitive adhesive (N/cm) | | | |
| Example | 1 | | Applied | 0.09 | 3.94 | 2.51 | 92.2 | 70.8 | 84 |
| | 2 | | Applied | 0.05 | 3.88 | 2.30 | 93.4 | 67.4 | 87 |
| | 3 | | Applied | 0.11 | 4.87 | 3.57 | 87.6 | 63.6 | 83 |
| | 4 | | Applied | 0.09 | 4.92 | 3.20 | 91.6 | 66.6 | 81 |
| | 5 | | Applied | 0.09 | 56.7 | 4.50 | 93.4 | 63.8 | 82 |
| | 6 | | Applied | 0.09 | 3.54 | 2.12 | 95.8 | 68.1 | 88 |
| | 7 | | Applied | 0.09 | 3.65 | 2.20 | 93.6 | 64.9 | 85 |
| | 8 | | Applied | 0.09 | 4.12 | 2.45 | 94.1 | 65.3 | 83 |
| | 9 | | Applied | 0.05 | 4.19 | 2.78 | 88.4 | 71.1 | 82 |
| | 10 | | Applied | 0.17 | 4.68 | 3.46 | 87.2 | 67.1 | 85 |
| | 11 | | Applied | 0.09 | 4.28 | 2.51 | 90.7 | 68.2 | 83 |
| | 12 | | Applied | 0.09 | 3.95 | 2.43 | 94.5 | 61.3 | 82 |
| | 13 | | Applied | 0.09 | 4.18 | 2.64 | 95.7 | 62.7 | 81 |
| | 14 | | Applied | 0.09 | 4.31 | 2.49 | 95.2 | 58.1 | 84 |
| | 15 | | Applied | 0.09 | 4.25 | 2.46 | 94.0 | 59.1 | 83 |
| Comparative Examples | 1 | | Not Applied | 0.5 | 3.91 | 2.48 | 93.4 | 78.0 | 72 |
| | 2 | | Not Applied | 0.5 | 4.76 | 3.50 | 91.4 | 83.4 | 71 |
| | 3 | | Not Applied | 0.5 | 4.02 | 2.12 | 90.2 | 81.6 | 72 |
| | 4 | | Applied | 0.09 | 2.58 | 1.18 | 89.5 | 64.5 | 91 |
| | 5 | | Applied | 0.09 | 2.84 | 1.35 | 91.9 | 68.1 | 93 |
| | 6 | | Applied | 0.09 | 2.76 | 1.37 | 89.4 | 65.3 | 90 |
| | 7 | | Applied | 0.11 | 4.88 | 3.80 | 92.1 | 66.9 | 77 |

TABLE 3-continued

| | | | | | | | |
|---|---|---|---|---|---|---|---|
| 8 | Applied | 0.09 | 5.12 | 3.86 | 92.4 | 67.1 | 69 |
| 9 | Applied | 0.09 | Hardly peeled off | Hardly peeled off | — | — | — |

*Parts by mass in relation to 100 parts by mass of modified polyolefin resin

In each of Examples 1 to 15, the obtained mold release film had a peel strength between the resin layer and the rubber-based pressure-sensitive adhesive exceeding 3.0 N/cm and had a sufficient adhesiveness; the acrylic pressure-sensitive adhesive after being bonded to the resin layer had a residual adhesion rate of 80% or more, and the resin layer components hardly migrated into the pressure-sensitive adhesive material; even when the mold release film was wound in a form of a roll, the contact angle of water on the opposite surface to the surface provided with the resin layer was 80° or less, and thus the opposite surface was not contaminated by the resin layer.

On the other hand, in each of Comparative Examples 1 to 3, the obtained mold release film had the resin layer provided by the offline application (post-coating), and accordingly the resin layer components tended to migrate into the pressure-sensitive adhesive material; the acrylic pressure-sensitive adhesive after being bonded to the resin layer had a low residual adhesion rate, and when the mold release film was wound in a form of a roll, the contamination due to the resin layer was found on the opposite surface to the surface provided with the resin layer.

In each of Comparative Examples 4 to 6, in the obtained mold release film, the olefin component constituting the resin layer was a polyethylene-based component, and hence the peel strength between the resin layer and the rubber-based pressure-sensitive adhesive was low.

In each of Comparative Examples 7 and 8, in the obtained mold release film, the resin layer deviated from the constitution specified in the present invention, the resin layer components tended to migrate into the pressure-sensitive adhesive material, and hence the acrylic pressure-sensitive adhesive after being bonded to the resin layer had a low residual adhesion rate.

In Comparative Example 9, the obtained mold release film included the cross-linking agent in a large content in the resin layer, and hence it was difficult to peel off the pressure-sensitive adhesive material bonded to the resin layer.

The invention claimed is:

1. A mold release film comprising a resin layer provided on one surface of a polyester film,
   wherein the resin layer includes 100 parts by mass of a polypropylene-based modified polyolefin resin with a proportion of a modifying component of 1 to 10% by mass and 1 to 50 parts by mass of a cross-linking agent;
   a peel strength between the resin layer and a pressure-sensitive adhesive measured by bonding a rubber-based pressure-sensitive adhesive to the resin layer exceeds 3.0 N/cm; and
   a residual adhesion rate of the pressure-sensitive adhesive after bonding an acrylic pressure-sensitive adhesive to the resin layer is 80% or more; and
   a contact angle of water on an opposite surface to the surface provided with the resin layer is 75° or less.

2. The mold release film according to claim 1, wherein the resin layer further includes polyvinyl alcohol, and a content of polyvinyl alcohol is 10 to 1000 parts by mass in relation to 100 parts by mass of the polypropylene-based modified polyolefin resin.

3. The mold release film according to claim 1, wherein the polyester film has a multilayer structure formed by laminating two or more types of layers, each type of layer having a different composition.

4. A method for producing a mold release film, the production method being a method for producing the mold release film according to claim 1, and comprising:
   applying to a polyester film a liquid material including 100 parts by mass of a polypropylene-based modified polyolefin resin with a proportion of a modifying component of 1 to 10% by mass, 1 to 50 parts by mass of a cross-linking agent and a liquid medium; and
   drying, stretching and heat treating the polyester film including the liquid material applied thereto.

5. The mold release film according to claim 2, wherein the polyester film has a multilayer structure formed by laminating two or more types of layers, each type of layer having a different composition.

* * * * *